United States Patent [19]
Cooper

[11] 3,854,500
[45] Dec. 17, 1974

[54] GATE VALVE
[75] Inventor: Thomas H. Cooper, Windsor, Conn.
[73] Assignee: Combustion Engineering, Inc., Windsor, Conn.
[22] Filed: Dec. 29, 1972
[21] Appl. No.: 319,592

[52] U.S. Cl................... 137/601, 251/56, 251/326, 251/328
[51] Int. Cl............................................... F16k 3/30
[58] Field of Search ... 137/599, 599.2, 601, 625.33, 137/630.12; 251/56, 326, 327, 328, 329

[56] References Cited
UNITED STATES PATENTS

| | | | |
|---|---|---|---|
| 1,327,731 | 1/1920 | Peterson | 251/329 |
| 1,523,239 | 1/1925 | Sweeney | 251/324 X |
| 2,950,897 | 8/1960 | Bryant | 251/328 X |
| 3,135,284 | 6/1964 | Magos | 137/599 X |
| 3,367,625 | 2/1968 | Fortune | 251/327 X |
| 3,572,656 | 3/1971 | Oshima | 137/601 X |
| 3,633,239 | 1/1972 | Meyerhoefer | 137/601 X |
| 3,661,357 | 5/1972 | Armstrong, Jr. | 251/326 X |

Primary Examiner—Robert G. Nilson

[57] ABSTRACT

A large gate valve with a multiplicity of gates which are slidably guided in valve seats equipped with ridges or grooves to form a labyrinth seal between the gate and the seat. Each gate is pivotally connected to a driving means in a single central position to reduce the possibility of jamming when the gates are opened or closed. The opening and closing of each gate is further facilitated by a support means which lifts the gate against differential pressure on a cushion of air thereby decreasing the sliding friction.

1 Claim, 4 Drawing Figures

PATENTED DEC 17 1974 3,854,500
SHEET 1 OF 2
FIG. 1
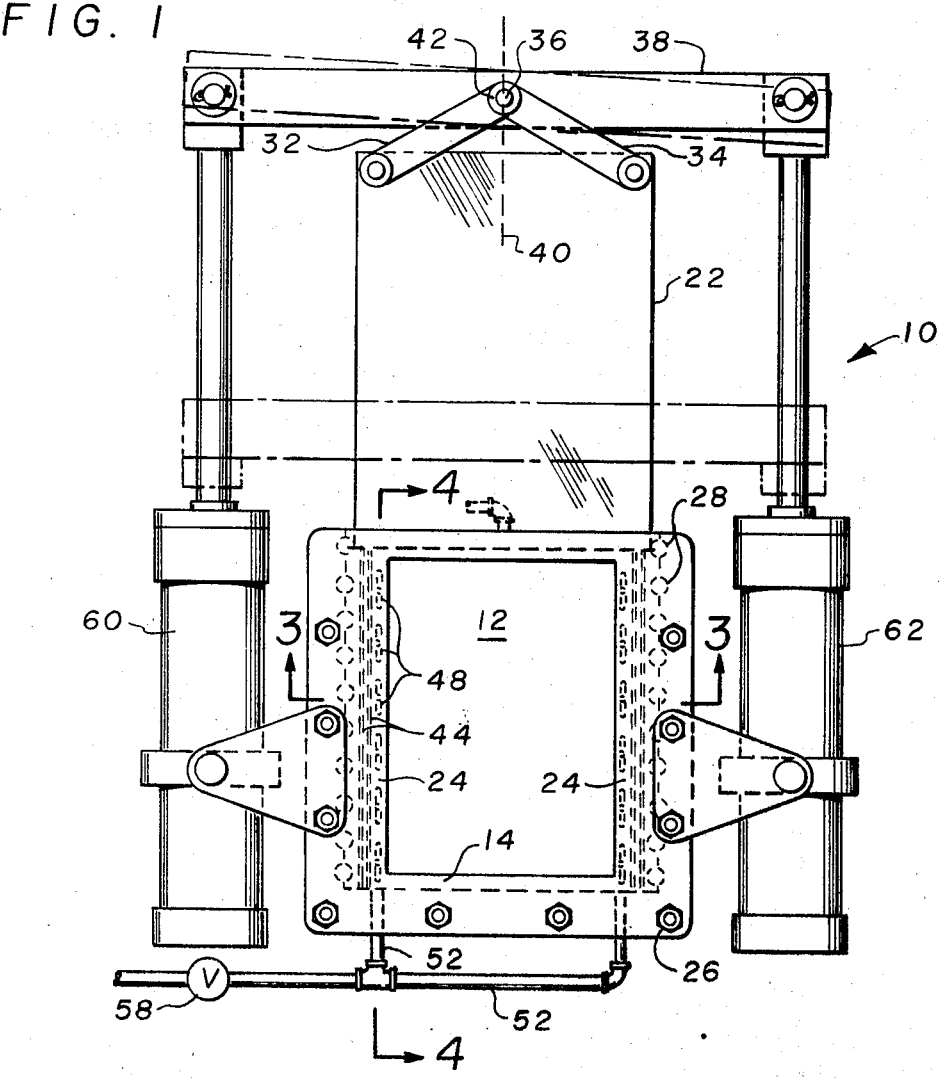
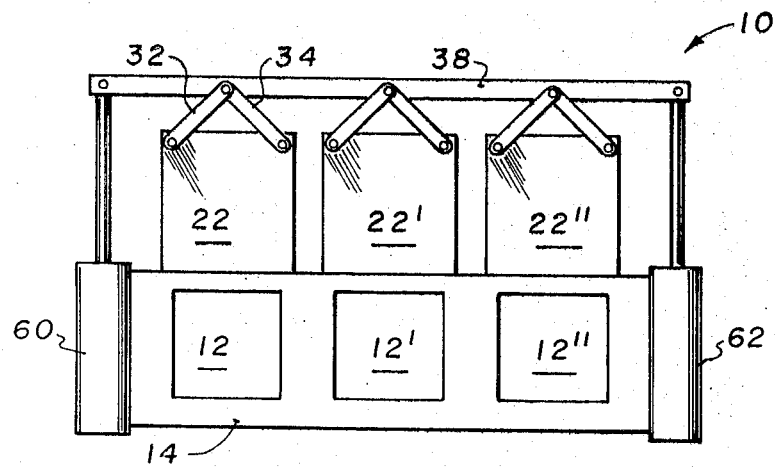
FIG. 2

GATE VALVE

BACKGROUND OF THE INVENTION

This invention relates to large fluid shut-off valves of the gate type. More specifically this invention relates to "Blast Gates" used to control hot gases, whose temperature may be in the range of 400°–800°F, flowing to or from a furnace, wind box or pulverizer of fossil fuel fired steam generators.

Gate valves are widely used in the control of large fluid flows because of the desirable flow characteristics produced by their unimpeded flow-through construction. The typical gate valve consists merely of a valve body with a through passage for the flow of liquid and a transverse track or seat which permits and guides the movement of a plate-like gate for flow blocking.

A number of problems are inherent in the operation of large blast gates of the type which are the subject of this invention. In order to achieve a reasonable gas seal in the prior art devices between the gate and the sealing means, the clearances between the gate and the seat have to be kept very small. But, with small clearances, sticking or jamming becomes a common occurrence and large forces are required to free the gate and to move the gate across its tracks or seats. If high pressures are involved, which is often the case in large ducts leading to or from furnaces, the pressure tends to force the gate against one seat and radically increase the friction between the gate and the seat thereby making movement of the gate even more difficult.

This jamming phenomenon is aggravated when there is a high temperature differential across the gate, which is also often the case in large ducts leading to or from furnaces. The high temperature differential causes one side of a thick gate to have a higher temperature than the other side of the gate, resulting in greater heat expansion of the hot side than of the cool side. As a result, the gate acts as a bimetallic strip and warps in the direction of the higher temperature. The warping increases the binding or jamming of the gate in its seats. In addition, when the gate is moved from its cooler open position to its hotter, closed position, linear expansion caused by the increased overall temperature of the gate in its closed position occurs, resulting in slightly larger gate dimensions. The larger dimensions also have the effect of jamming the gate in its seats.

One prior art attempt to alleviate the jamming due to expansion and warping of the blade was to allow greater clearances between the gate and the gate seat. This not only had the effect of increasing fluid leakage but also introduced a further problem of gate jamming due to the cocking of the blade in its larger seats. Blade cocking would occur when the gate closing means, connected to the gate by a rigid connection, allowed or forced one edge to lead the other edge while opening or closing the gate. The common closing means consists of two pneumatic cylinders on either side of the gate. Cocking and jamming would occur if one cylinder preceded the other.

SUMMARY OF THE INVENTION

This invention is designed to overcome the cocking, warping, linear expansion, friction due to high pressures, and fluid leakage problems experienced by the prior art. The invention connects the driving or closing means to the gate by a centrally located pivotal connection, thereby allowing closing and opening of the valve without blade cocking. In combination with this improvement, a multiparallel gate is proposed to reduce the size of the individual gates thereby reducing the large thermal warp observed in one large gate. Gates of reduced size also reduce the overall linear temperature expansion observed in large gates, thus allowing smaller clearances and reduced gas leakage.

To overcome the friction problem resulting from high pressures pressing on the valve gate, the invention proposes an air cushion support which lifts the gate against the high pressure and allows low friction opening of the gate. This support consists of pressurized air which is admitted to a series of end-to-end grooves whose openings face upstream and face the edge portion of the downstream face of the gate. Pressurized air is admitted to each groove by valves triggered by the movement of the gate.

The gate sealing means consists of a plurality of longitudinal grooves arranged in the valve body facing upstream and parallel to the direction of movement of the gate. The gate blade's edges slide along and overlie the grooves creating close metal-to-metal contact and a labyrinthian seal.

BRIEF DESCRIPTION OF THE DRAWINGS

FIG. 1 is an end view of the valve incorporating the invention.

FIG. 2 is an end view of a plurality of parallel valves of FIG. 1.

DESCRIPTION OF THE PREFERRED EMBODIMENT

Figure 3:
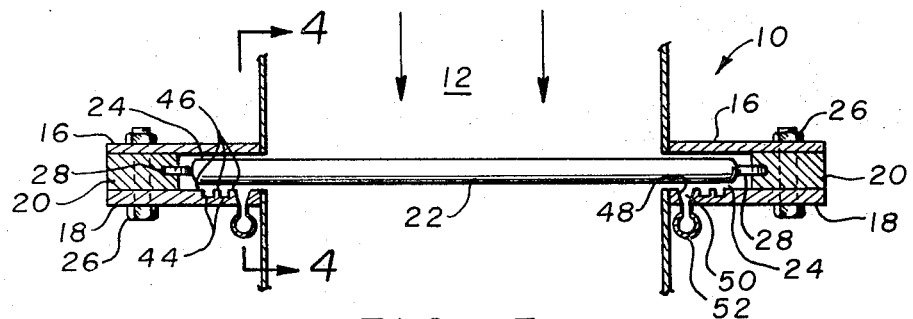
FIG. 3 is a cross-sectional view of the valve taken along the line 3—3 of FIG. 1.
Figure 4:
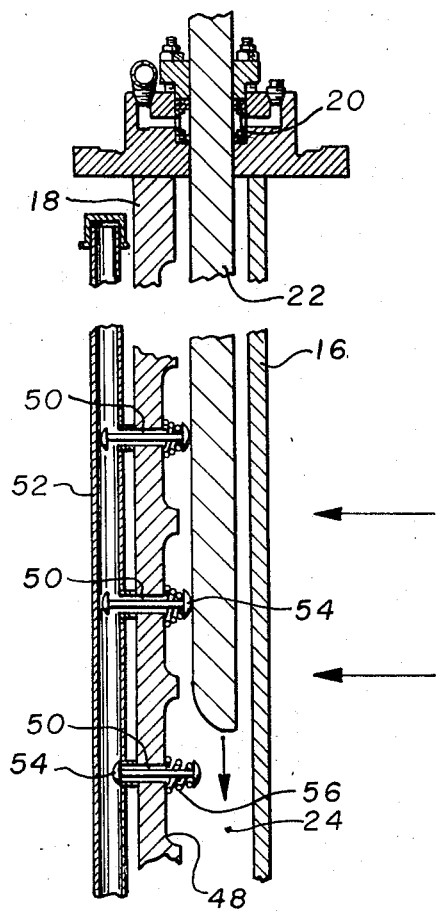
FIG. 4 is a detailed cross-sectional view of the valve taken along the line 4—4 of FIG. 1 or FIG. 3.

As shown in drawing (FIG.) 1, the gate valve indicated generally as 10 comprises a valve body 14 having a through passage 12 therethrough. The body may comprise two metal parts 16 and 18 separated by a spacer member 20 to form channels or guides 24, which will be called the gate seats, between the members 16 and 18 for receiving the gate 22. The gate seats 24 of the gate receiving channel adjacent the through passage 12 provide metal-to-metal sealing means for the outside faces and end of the gate 22 which is slid across said seats in its closing and opening movements. The valve parts 16 and 18 may be secured to each other and clamp the spacing member 20 between them by any suitable means, such as bolts 26.

Within the area of the gate seats 24 are positioned roller guiding means 28 for guiding the gate 22 in and out of the valve body 14. As the gate is moved in and out of fluid flow blocking position, it passes through valve packing means 20 that are well known in the art. The valve packing means may include a chamber therein which may be supplied with a pressurized fluid, such as compressed air, at a pressure higher than that controlled by the valve to prevent leakage from the through passage 12 outward past the gate 22.

A pair of bars 32 and 34 are fostered to one end to the gate 22 and are pivotally fastened at their other ends to a member 38 and to each other by pin 42 at one pivotal position 36. The pivotal position 36 lies along the gate's centerline 40 or an extension thereof. Connecting member 38 is pivotally connected to the two driving cylinders 60, 62 at its opposite ends. By this pivotal means, gate 22 can be closed and opened without cocking if either cylinder 60 or 62 operates in advance of the other.

For gate valves with fluid flow through passages 12 larger in size than 3 feet, a plurality of gates 22, 22', 22" of reduced dimensions but with the same total fluid flow blocking area as the flow through passage 12 may be arranged in parallel (see FIG. 2). By this means, the dimensions of all parts of the multiparallel gate may be kept under 3 feet. By so limiting the linear dimensions, both the warping and linear expansion problems, discussed above in the prior art, are kept to a minimum.

Within the gate seats 24, for receiving the gate 22 and forming a tight gas seal, are longitudinal grooves 44 which are formed in the valve body member 18 facing upstream and oriented in the direction of movement of the gate. When the gate 22 is closed, the sides of the downstream face of the gate overlap the grooves 44. Grooves 44 reduce the total area of metal-to-metal contact between gate 22 and valve seat member 18. By reducing the area of metal-to-metal contact, sealing between these two metal surfaces is enhanced and a labyrinthian seal is formed. The sealing contact of the labyrinthian seal is greatly improved by the large pressures pressing on the upstream side of the gate. The gate is urged by the pressure into intimate contact with the sealing ridges 46 which lie between the labyrinthian grooves 44.

Also within the seat area 24 are a series of short longitudinal grooves 48 arranged end-to-end in a line parallel to the grooves 44 and therefore also oriented in the direction of the gate's movement. Each groove individually communicates by means of a passage 50 with a pipe 52 carrying pressurized air. Valves 54 are situated within and through passages 50 and are urged into gas-tight sealing position by springs 56. The pressurized air may be admitted to the pipe 52 by a control valve 58 which may be actuated according to the position of the gate and according to mode of gate valve operation desired, (i.e., closing, opening or inactive).

The valves 54 are individually actuated by the gate 22 as it slides in and out of the valve seats 24. When the valves are actuated, each groove 48 individually fills with pressurized air and the gate 22 is lifted off of its labyrinthian seat, against the pressure of the system, by the pressurized air. In this way the gate can be made to ride on a lubricating film of pressurized air and the jamming problems due to the great pressures on gate 22 and problems due to friction experienced by gate 22 are eliminated.

It will be understood that the embodiment shown and described herein is merely illustrative and that changes may be made without departing from the scope of the invention as claimed.

What is claimed is:

1. A gate valve for controlling flow of fluid under pressure comprising:
   a. a plurality of gates arranged in parallel;
   b. a plurality of valve bodies for receiving said gates;
   c. means on said valve bodies for providing a labyrinth seal between said gates and said valve bodies;
   d. means for moving said multiparallel gates in their planes between and across said labyrinth seal means for valve closing and opening;
   e. means pivotally interconnecting said gates and said moving means at one point for each gate, said point for each gate lying along a line passing through an individual gate's center of mass parallel to the direction of movement of said gate, for transferring the force generated by said valve opening and closing means to said gates; and
   f. fluid support means positioned at the downstream side of said gates for reducing sliding friction between said gate and said valve body when opening and closing said gates by lifting said gates against said fluid pressure.

* * * * *